United States Patent [19]
Ansley

[11] Patent Number: 5,151,799
[45] Date of Patent: Sep. 29, 1992

[54] SYSTEM AND TECHNIQUE FOR MAKING HOLOGRAPHIC PROJECTION SCREENS

[75] Inventor: David A. Ansley, Long Beach, Calif.

[73] Assignee: Hughes Aircraft Company, Los Angeles, Calif.

[21] Appl. No.: 653,526

[22] Filed: Feb. 11, 1991

[51] Int. Cl.⁵ .......................... G03H 1/14; G03H 1/30
[52] U.S. Cl. ......................................... 359/11; 359/26; 359/30
[58] Field of Search .................... 350/3.67, 3.68, 3.78, 350/3.79; 359/10, 11, 25, 26, 30

[56] References Cited

U.S. PATENT DOCUMENTS

| | | | |
|---|---|---|---|
| 3,539,242 | 11/1970 | Burch et al. | 359/30 |
| 3,558,207 | 1/1971 | Worthington, Jr. | 359/30 |
| 3,572,882 | 3/1971 | Neumann | 350/3.67 |
| 3,622,794 | 11/1971 | Pond et al. | 350/3.67 |
| 3,632,214 | 1/1972 | Chang et al. | 350/3.67 |
| 3,636,838 | 1/1972 | Chang et al. | 350/3.79 |
| 3,659,947 | 5/1972 | Neumann | 350/3.67 |
| 3,697,149 | 10/1972 | Van Heeckeren et al. | 350/3.79 |
| 3,812,496 | 5/1974 | Brooks | 350/3.79 |
| 3,838,903 | 10/1974 | Leith et al. | 350/3.79 |
| 3,964,032 | 6/1976 | Bardos | 350/3.79 |
| 4,212,536 | 7/1980 | Bencze et al. | 359/30 |
| 4,500,163 | 2/1985 | Burns et al. | 350/3.7 |

OTHER PUBLICATIONS

Bardos et al., "Gigabit/Second Recording with Holography," Proceedings of the Technical Program, Electro-Optical Systems Design Conference, Sep. 18-20, 1973, New York, pp. 90 to 101.
Johnson et al, "Scophony Spatial Light Modulator," Optical Engineering, vol. 24, No. 1, Jan.-Feb. 1985, pp. 94 to 95.

Primary Examiner—Bruce Y. Arnold
Assistant Examiner—Martin Lerner
Attorney, Agent, or Firm—Michael W. Sales; Wanda K. Denson-Low

[57] ABSTRACT

A fast, accurate system for manufacturing holographic projection screens. The invention (10) includes a mechanism (28) for moving holographic film (26) along a longitudinal axis thereof in a first direction. A mechanism (12) is provided for directing and maintaining an input beam (22) onto the film (26) as the film (26) is moved. The application of a reference beam (23) is then effective to create an interference pattern on the film (26) with the input beam (22). The mechanism (12) for maintaining the input image at a fixed location on the film includes a polygon shaped mirror mounted to rotate at a rate determined in accordance with the rate of movement of the film. An image stabilization system (40) is also provided which includes a detector (58) for monitoring an interference pattern created by the signal beam and the reference beam. Circuitry (60) is included for providing control signals in response to the detector (58) outputs. A phase shifter (44) induces a phase shift in the reference beam. A phase shifter positioning mechanism (46) adjusts the phase shifter (44) in response to the control signals so that the image is stabilized on the film (26) despite the movement thereof.

15 Claims, 5 Drawing Sheets

SYSTEM AND TECHNIQUE FOR MAKING HOLOGRAPHIC PROJECTION SCREENS

BACKGROUND OF THE INVENTION

1. Field of the Invention

The present invention relates to optical imaging systems and fabrication techniques therefor. More specifically, the present invention relates to techniques for fabricating holographic projection screens.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Visual displays are useful for many applications including the simulation of scenery to allow for the training of a vehicle operator. For example, air flight simulators allow a simulator pilot to view imagery on a projection screen while piloting a mock aircraft. As shown in FIG. 1, in a typical simulator, the simulator pilot is positioned at the center of a large diameter dome. The diameter of the dome is typically between 9.5 and 40 feet. The visual display is projected onto the inner surface of the dome by means of one or more projectors located outside the dome. Input imagery is projected through a small hole in the dome onto the hemisphere opposite the point of projection. The dotted line in FIG. 1 shows the boundary of the forward hemisphere into which Projector "A" projects a visual display. The visual display is projected onto the inner surface of the dome (hereinafter the "screen"). The angle of incidence of light at the screen is equal to the projection angle. The angle of reflection of light from the screen is equal to the angle of incidence and therefore the projection angle. Since the projection angle typically varies from 0 to 57 degrees, the angle of reflection typically varies from 0 to 57 degrees. This is problematic in that it prohibits the use of screens with optical gain.

The use of screens with high optical gain is highly desirable as these screens afford improved brightness and contrast ratio for the visual display. Unfortunately, the high optical gain is in the specular reflection direction. As shown in FIG. 1, the specular reflection direction is away from the pilot's location for large projection angles. At large projection angles, the visual display brightness using a gain screen is less than if a standard Lambertian screen was used. (A Lambertian screen has an optical gain that is uniform in all directions but the gain is always one or less.)

Because of the integrating sphere effects, the gain should be less than one and typically, 0.5±0.1. Thus, instead of using a screen with a gain of 4, which is typical for flat screen displays, dome visual displays typically must use a screen with a gain of only 0.5. Consequently, the brightness is only ⅛th as bright as the equivalent flat gain screen visual display.

Holographic screens were developed for use in simulators to reduce specular reflection thereby increasing the brightness of the image seen by the simulator pilot. A hologram has the unique characteristic that if light is incident on the hologram from one direction then light is caused to be propagated in a second direction other than the specular reflection direction. FIG. 2 shows a closeup of a holographic screen. As shown, the projected beam causes light to propagate in the direction of the simulator pilot. Depending upon the design and manufacture of the hologram, practically all of the light is propagated in the direction of the simulator pilot and ideally none of the light is propagated in the specular reflection direction. This enables high brightness visual displays because most of the projector light is propagated in the direction of the simulator pilot.

Initially, holographic projection screens were made using a diffuser to enable the simulator pilot to see the visual display. If the holographic projection screen is made without a diffuser, the pilot would see only a single bright point of light throughout the entire angular subtense of the holographic screen. For example, if the holographic screen were made in increments of one square foot, the simulator pilot would see only one bright point of light per square foot of holographic projection screen area.

The undesirable aspect of a holographic projection screen made with a diffuser is that it reproduces the speckle of the diffuser. Speckle is a phenomenon that occurs whenever coherent light is used to illuminate a diffuse surface. It appears as a grainy texture superimposed on the diffuse surface, but yet projected out in space to the plane of the observer and therefore it can be quite irritating to the observer. It is therefore desirable to eliminate the speckle associated with conventional holographic projection screens.

There is no speckle when coherent light is reflected from a smooth surface like a mirror. In that case, a spherical wave-front is produced without any of the interference which causes the speckle. The problem of a "single bright point per hologram" was eliminated by making each hologram smaller than the resolution of the visual display. This type of holographic projection screen is called a "microdot" holographic projection screen. Each hologram is smaller than the resolution of the visual display. Each hologram is essentially a high resolution picture of the interference pattern created by the interaction of two laser beams, a signal beam containing the "image" and a reference beam. When the two beams interact, the beams interfere with each other constructively and destructively. Where the beams interfere constructively, an area of maximum optical intensity is created and recorded on photographic film as a light area, typically a line. Likewise, where the two beams interfere destructively, an area of minimum optical intensity is created which is recorded on film as a dark area. When the photograph of the interference pattern thus created is illuminated by the reference beam, the input image is created.

Creation of the hologram has heretofore been a slow and cumbersome process due to the requirement that the film be held still while the interference pattern is recorded thereon. For example, U.S. Pat. No. 4,500,163, issued Feb. 19, 1985, to R. H. Burns et al., describes a step and repeat method for making microdot holographic projection screen holograms. However, making microdot holograms one hologram at a time is a slow process. The holographic film is mounted on an x-y transport. After moving to the center of the next microdot hologram, the x-y transport must stop moving (settle) before the exposure can begin. Mechanical movements of a fraction of a wavelength of light will ruin the interference pattern and hence the microdot hologram. Hence, the process is quite slow.

The following is an example of the length of time required to make a one square foot hologram with microdot hologram spacing at 8.29 mil intervals (2.1 million microdots per square foot).

| Microdots per sec. | Inches per second | Time (hrs.) |
| --- | --- | --- |
| 12 | 0.1 | 48.5 |
| 36 | 0.3 | 16.2 |
| 60 | 0.5 | 9.7 |
| 120 | 1.0 | 4.9 |

Thus, the time required to make a square foot hologram could be several days.

Further, the start and stop movement requires considerable laser power because the photographic film may only be exposed after it has stopped moving. Power is consumed while the laser waits in a power up standby mode for the film to stop moving.

Thus, there is a need in the art for a faster technique for making microdot holograms which, ideally, also consumes less power.

SUMMARY OF THE INVENTION

The need in the art is addressed by the present invention which provides a fast, accurate system for manufacturing holographic projection screens. The invention includes a mechanism for moving holographic film along a longitudinal axis thereof in a first direction. A mechanism is provided for directing and maintaining an input beam onto the film as the film is moved. The application of a reference beam is then effective to create an interference pattern with the input beam which is stored on the film.

In a specific embodiment, the mechanism for maintaining the input image at a fixed location on the film includes a polygon shaped mirror mounted to rotate at a rate matched to the rate of movement of the film.

The present invention also provides an image stabilization system which includes a detector for monitoring an interference pattern created by a signal beam and a reference beam. Control circuitry is included which is responsive to signals from the detector and provides servo control signals in response thereto. A phase shifter induces a phase shift in the reference beam. A phase shifter positioning mechanism adjusts the phase shifter in response to the control signals to stabilize the image on the hologram despite the movement thereof.

DESCRIPTION OF THE INVENTION

Illustrative embodiments and exemplary applications will now be described with reference to the accompanying drawings to disclose the advantageous teachings of the present invention.

Figure 1:
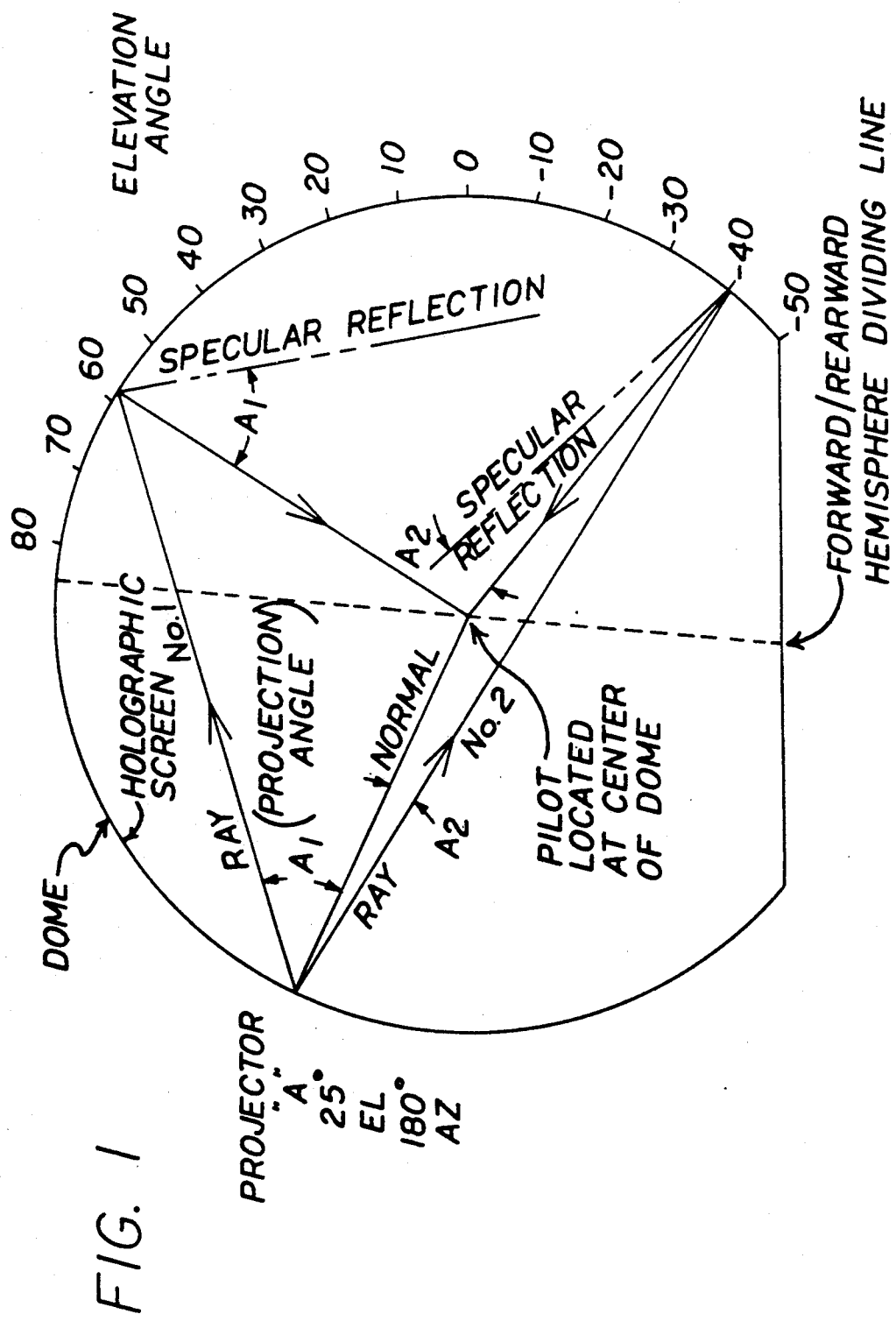
FIG. 1 is an optical schematic diagram from a side view of a typical dome display such as that used in a simulator illustrating the need for a holographic display.
Figure 2:
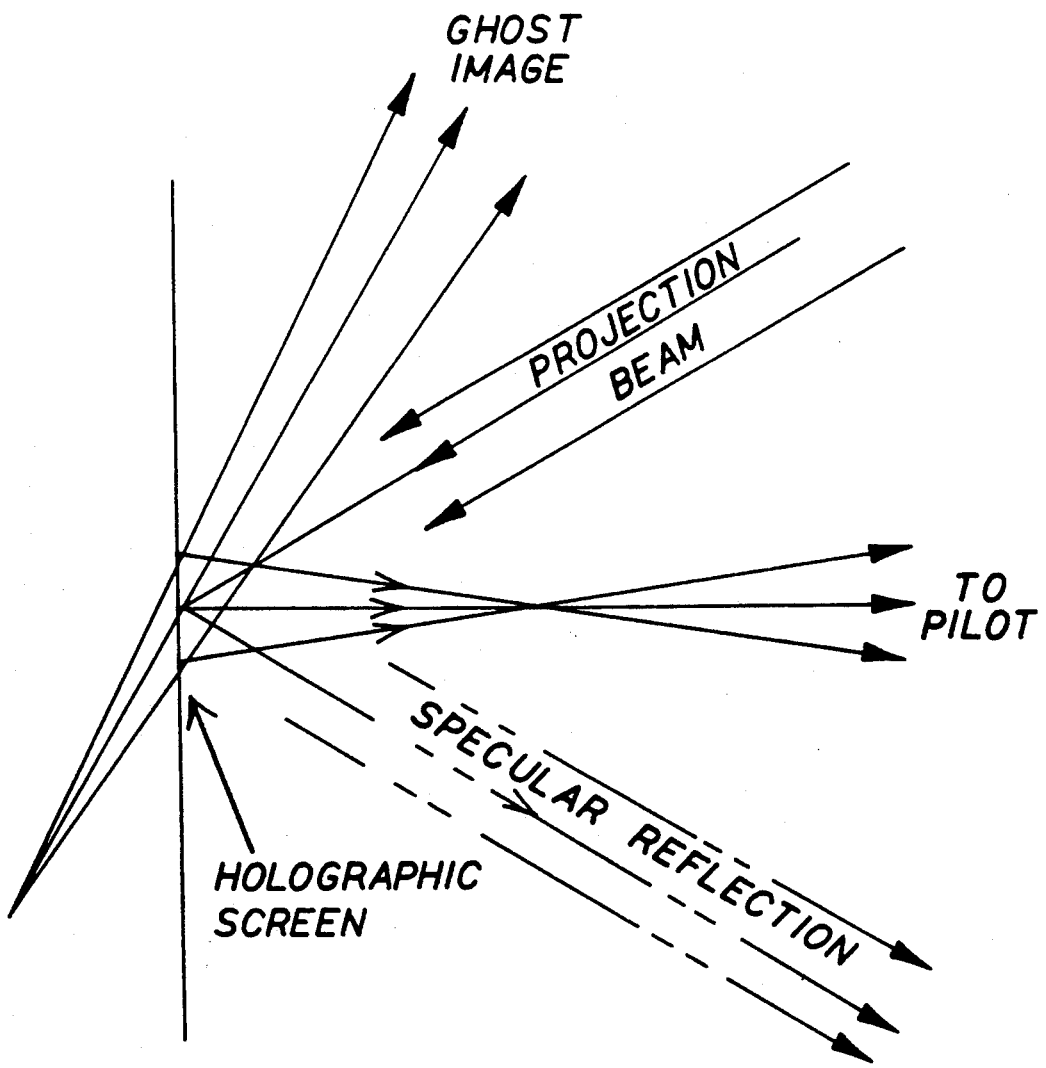
FIG. 2 is an optical schematic diagram from a closeup sectional side view of a holographic screen.
Figure 3A:
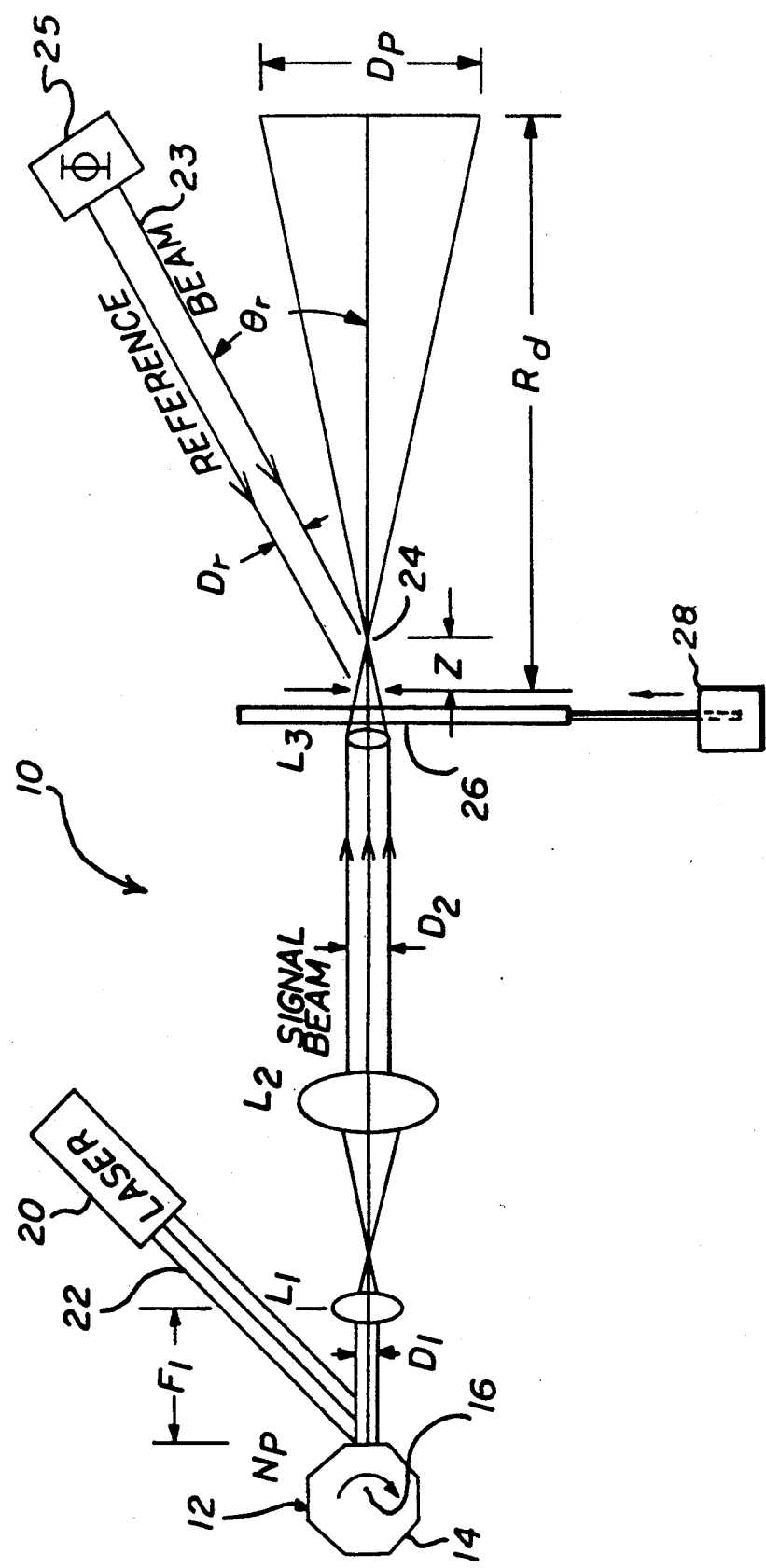
FIG. 3(a) is an optical schematic diagram of an illustrative embodiment of the system for manufacturing holographic projection screens of the present invention.

FIG. 3(a) is an optical schematic diagram of an illustrative embodiment of the system for manufacturing holographic projection screens of the present invention. The system 10 includes a multi-faceted polygon 12 with $N_p$ mirrored facets 14. The polygon 12 is mounted for rotation about a longitudinal axis 16 extending through the center thereof. The polygon is driven by a motor (not shown). The polygon 12 may be implemented with a conventional scanning mirror or galvanometer. An input signal beam 22 of coherent light from a source such as a laser 20 is reflected off a facet 14 of the polygon 12. Thus, the polygon 12 scans the signal beam 22 of diameter $D_1$ through an afocal telescope consisting of lenses $L_1$ and $L_2$. Lenses $L_1$ and $L_2$ change the diameter of the beam 22 from $D_1$ to $D_2$ by simple optics. A third lens $L_3$ focuses the beam 22 to a single point of light at the focal point 24 thereof. The lenses $L_1$, $L_2$ and $L_3$ should have F Theta distortion. A lens with F Theta distortion provides an image in the focal plane having a height equal to the lens focal length times the input angle.

An unexposed photographic film 26 is positioned a distance z from the focal plane of the lens $L_3$. The width of the signal beam at the hologram surface is $D_z$. A reference beam 23 of width $D_r$ is simultaneously incident on the same location of the unexposed photographic film 26 as the signal beam 22 at an angle of $\Theta_r$ with respect to the longitudinal axis of the signal beam 22. The reference beam is provided via an adjustable phase shifter 25 and is discussed more fully below.

Ideally, $$D_r = D_z \cos \Theta_r \quad [1]$$

The dome radius $R_d$ and the pupil diameter $D_p$ are illustrated in FIG. 3(a). The dome radius is the distance from the holographic screen to the observer. The pupil diameter $D_p$ is the diameter of the pupil surrounding the observer's head. Within the pupil the observer can see the image. Outside the pupil the observer can see nothing. The pupil diameter $D_p$ is typically 24 inches.

The hologram, a piece of high resolution photographic film, is moved by a film transport mechanism 28 which may be a push rod, or other conventional mechanism for moving the film 26. The film transport mechanism 28 moves the film 26 along the longitudinal axis thereof. The film is mounted so that the direction of movement of the film 26 is normal to the longitudinal axis of the polygon 12. In effect, the film is moved in a direction opposite to the scan of the beam 22 thereacross. In accordance, with the present teachings, the scan of the beam 22 is synchronized with the movement of the film 26 so that the image is stationary on the film. Thus, the system 10 of the present invention allows for a moving image to be held stationary on the film during exposure thereof. Start and stop motion is eliminated thereby obviating the necessity to allow the mechanism to settle as is required by the step and repeat method of the prior art.

Figure 3B:
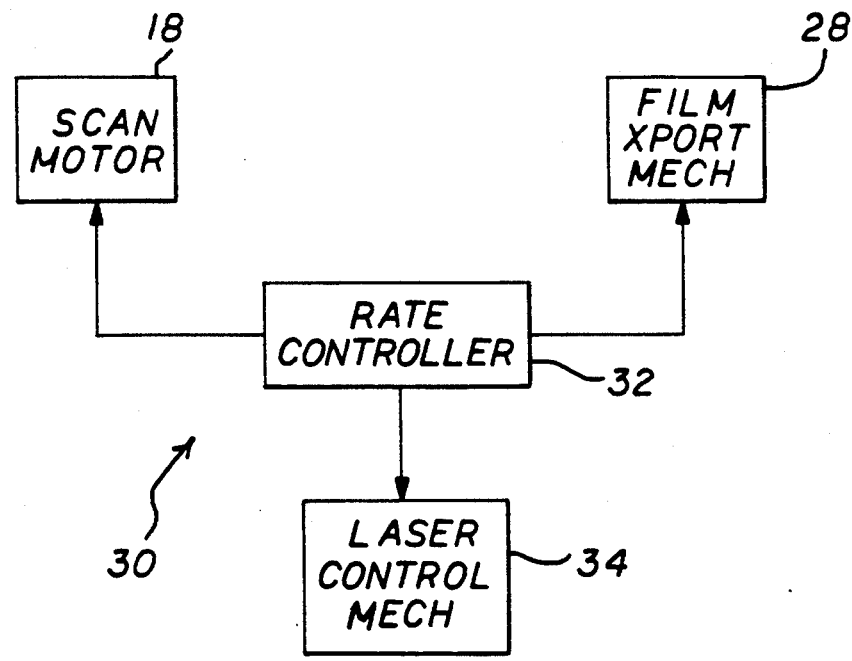
FIG. 3(b) is a block diagram of an illustrative implementation of a rate control system utilized in the present invention.

FIG. 3(b) shows an illustrative implementation of a rate control system 30 for controlling the movement of the hologram 26 relative to the movement of the scanning polygon 12 to achieve a stationary holographic image thereon. The rate control system 30 includes a rate controller 32 which is connected to the scan motor 18 and the hologram film transport mechanism 28. The rate controller may be implemented with a microprocessor and the rotational velocity of the spinning polygon is adjusted of make the linear velocity to the image in the focal plane of the lens $L_3$ exactly match the linear velocity of the film plate.

The rate control mechanism may also be connected to a mechanism for controlling a shutter (not shown) which interrupts the beam from the source 20.

During exposure of each microdot, the optical path difference cannot change by more than a fraction of a wavelength with respect to the photographic film. Because the microdot is moving with respect to the reference beam, it is necessary to compensate for the change in optical path length. This is accomplished with the roof prism 44 of FIG. 4(a). (not shown in FIG. 3(b)). Moving the roof prism 44 in a direction opposite to the movement of the microdot hologram maintains a stationary optical path difference. By monitoring the brightness of the reference band signal beam interference pattern, as discussed below, and moving the roof prism 44 in a transverse direction, alignment of the reference beam and the signal beam may be maintained.

Figure 4B:
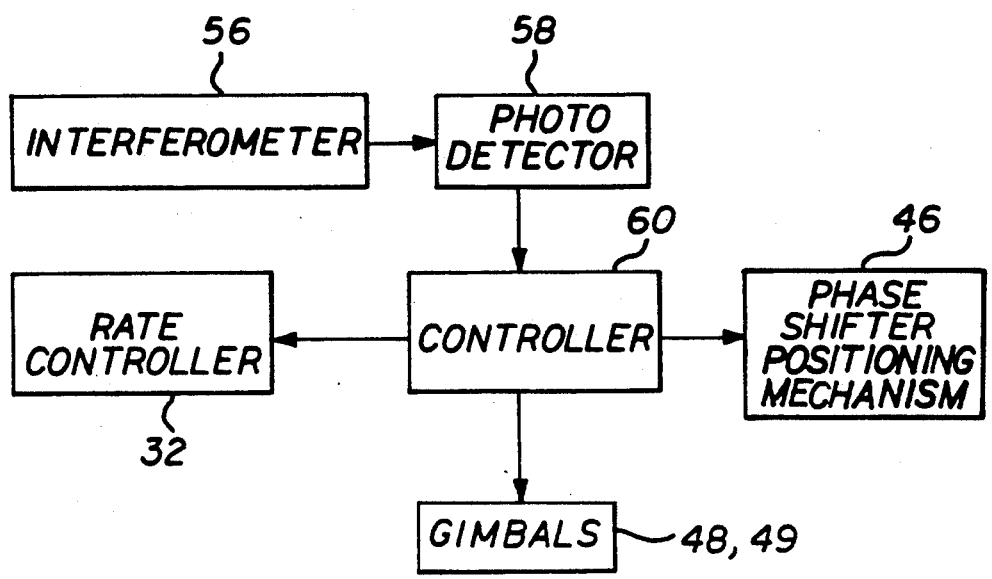
FIG. 4(b) is a block diagram of an illustrative implementation of the control system of the stabilization system of the system for manufacturing holographic projection screens of the present invention.
Figure 4A:
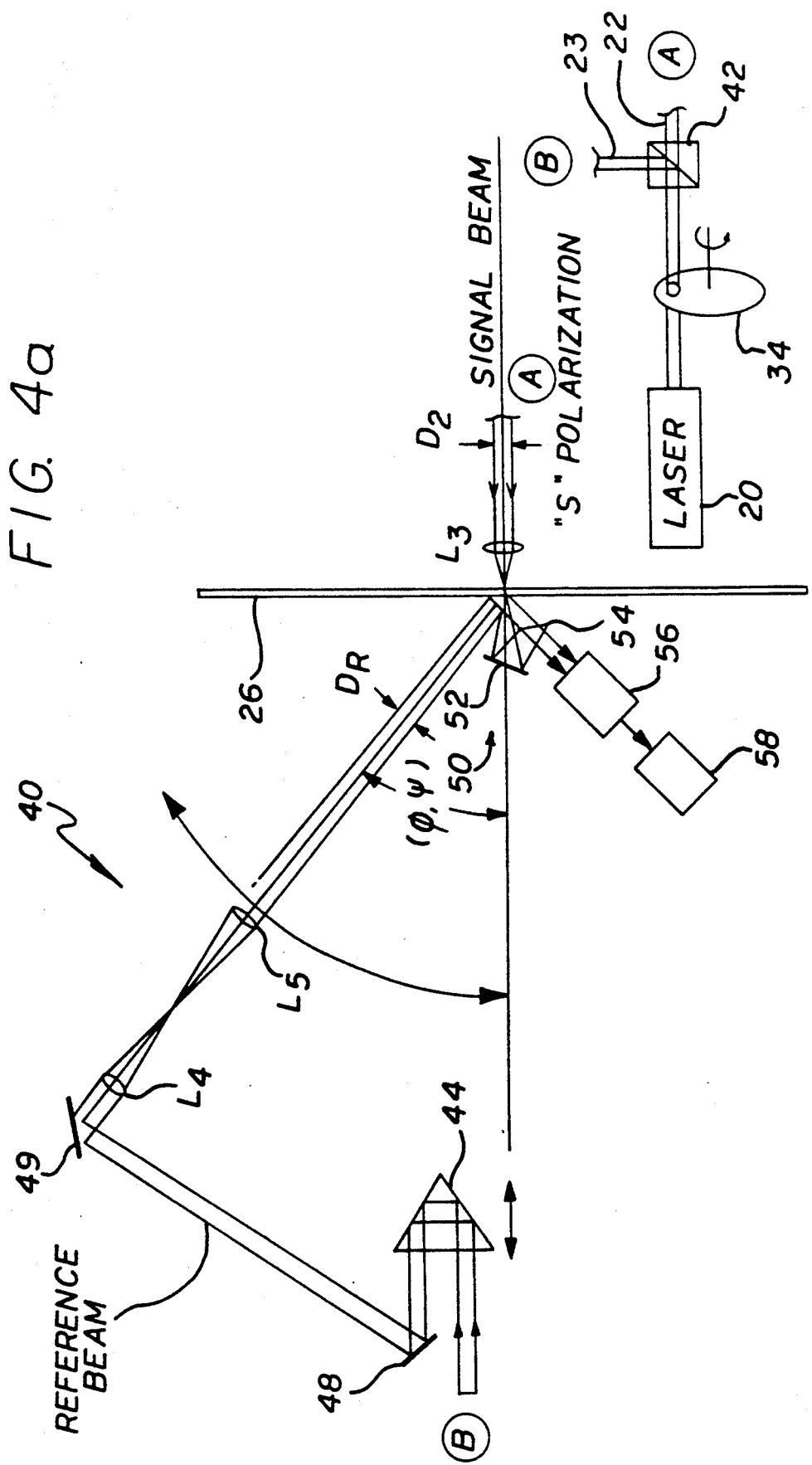
FIG. 4(a) is an optical schematic diagram of an illustrative implementation of an image stabilization system utilized with the system for manufacturing holographic projection screens of the present invention.

FIG. 4(a) is an optical schematic diagram of an illustrative implementation of an image stabilization system utilized with the system for manufacturing holographic projection screens of the present invention. Both the signal beam 22 and the reference beam 23 originate from the same coherent source, the laser 20. The beam from the laser 20 passes through opening in the shutter 34 which is controlled by the rate controller 32 of FIG. 3(b). The beam is then split by a conventional beamsplitter 42 into the signal beam 22 and the reference beam 23, each of appropriate intensity. (Optical filtering of the reference beam, signal beam or both beams may be necessary in order to obtain the optimum diffraction efficiency from the developed hologram.) The signal beam 22 is applied to the film 26 as described above with respect to FIG. 3(a). The reference beam 23 is applied to an adjustable phase shifter 25. The adjustable phase shifter 25 is implemented with a roof prism 44 and a phase shifter adjustment mechanism 46 (not shown). The reference beam 23 exits the roof prism 44 and is directed by first and second gimballed mirrors 48 and 49 onto the holographic film 26 via fourth and fifth lenses $L_4$ and $L_5$. The gimballed mirrors are fixed during exposure and changed thereafter as necessary to direct the reference beam at the correct angle relative to the holographic film to achieve the x and y coordinate values per each projection angle. The gimbals are indexed only during a transition from one microdot hologram to the next adjacent microdot hologram. The lenses $L_4$ and $L_5$ serve the same purpose as lenses $L_1$ and $L_2$, viz., to change the diameter of the beam 23.

The interference pattern created by the intersection of the signal beam 22 and the reference beam 23 on the photographic film is monitored by a detector arrangement 50. The detector arrangement 50 includes a mirror 52 mounted in the optical path of the signal beam 22. The mirror 52 reflects the signal beam 22 to a beamcombiner 54 from which the beam is reflected to an interferometer 56. The mirror 52 and the beamcombiner 54 may be of conventional design and construction. Simultaneously, the reference beam is reflected off the film 26 through the beamcombiner 54 to the interferometer 56. The interference pattern is formed on the interferometer 56 and is detected by a photodetector 58.

As shown in FIG. 4(b), the closed loop servo-control system is completed by a system controller 60. The controller 60 controls the position of the phase shifter via the phase shifter positioning mechanism 46 in response to the output of the photodetector 58.

The system controller 60 also controls the positions of the gimbals 48 and 49 as necessary for each projection angle.

The rate at which the holograms are made is also controlled through the system controller 60 via the rate controller 32.

In accordance with the teachings provided herein, the following table presents the magnitude of illustrate values for a 9.5 foot diameter dome and a 40 foot diameter dome.

TABLE I

| | | | |
|---|---|---|---|
| $R_d$ - | radius of dome (ft) | 4.75 | 20 |
| $D_p$ - | diameter of viewing volume (in inches) | 24 | 24 |
| $D_z$ - | microdot hologram width (mm) (½ arc-min angular subtend) | .211 | .887 |
| Z - | location of hologram from focus of lens $L_3$ | .500 | 8.85 |
| $\Theta_r$ - | angle between signal and reference beams | 56.75 | 56.75 |
| $D_r$ - | width of reference beam (mm) | .116 | .486 |
| $F_3$ - | focal length of lens $L_3$ (mm) | 11.73 | 49.39 |
| $D_2$ - | beam diameter out of lens $L_2$ (mm) | 4.94 | 4.95 |
| $F_2$ - | focal length of lens $L_2$ (mm) | 300 | 300 |
| $F_1$ - | focal length of lens $L_1$ (mm) | 15 | 15 |
| $D_1$ - | beam diameter into lens $L_1$ (mm) | .247 | .247 |
| $N_p$ - | number of polygon facets | 35 | 35 |
| $S_p$ - | polygon rev/sec @ 10 inches/sec transport | 34.46 | 8.18 |
| $\Phi$ - | number wave phase shift @ 515 nm | 342.27 | 1441.15 |

The hologram master is made flat and subsequent copies will become curved when applied to the inside of the dome. As a result, the reference beam angle must be changed slightly as the unexposed hologram is transported in both the x and y directions. The following table shows the change in reference beam angle.

TABLE II

| Dome diameter (ft) | 9.5 | 40.0 |
|---|---|---|
| Change in reference beam angle per inch | .503 | .119 |
| Assumed hologram size (inches) | ±6.0 | ±6.0 |
| Change in reference beam angle | ±3.02 | ±.72 |

Thus, the present invention has been described herein with reference to a particular embodiment for a particular application. Those having ordinary skill in the art and access to the present teachings will recognize additional modifications applications and embodiments within the scope thereof. For example, the invention is not limited to the use of a spinning polygon. Any scanning mirror could be used. The only requirement is that the velocity of the image in the focal plane is equal to the velocity of the hologram transport.

It is therefore intended by the appended claims to cover any and all such applications, modifications and embodiments within the scope of the present invention.

What is claimed is:

1. A system for making holgraphic projection screens including:
   film means for storing an optical image;
   film transport means for moving said film means along a longitudinal axis thereof in a first direction;
   first optical means for providing an input signal beam;
   second optical means for providing a reference optical beam;
   movable beam direction means for directing and maintaining said input beam onto a first area on said film means as said film means moves in said first direction;
   means for directing said reference beam onto said first area on said film means to create an interference pattern with the input signal beam thereon;
   means for detecting the interference pattern created by the signal beam and the reference beam; and
   controller means responsive to the detecting means for controlling the movement of the film transport means and the movable beam direction means for stabilize the image despite movement of the film.

2. The invention of claim 1 wherein said movable beam direction means includes a polygon shaped cylinder with mirrored facets.

3. The invention of claim 2 wherein said polygon shaped mirror is mounted for rotational motion about a longitudinal axis thereof.

4. The invention of claim 3 wherein said polygon shaped mirror is mounted with the longitudinal axis thereof lying in a plane parallel to the plane of said film means with the longitudinal axis of said polygon shaped mirror being normal to the longitudinal axis of said film means such that said signal beam is reflected onto said film means along the longitudinal axis thereof.

5. The invention of claim 4 including means for rotating said polygon shaped mirror about the longitudinal axis thereof.

6. The invention of claim 5 including control means operatively connected to said means for rotating said polygon shaped mirror and said means for transporting said film means for matching the rate of rotation of said polygon shaped mirror to the rate of movement of said film transport means.

7. The invention of claim 1 including first and second lens means for changing the diameter of said signal beam.

8. The invention of claim 7 including third lens means for focusing said signal beam onto said film means.

9. The invention of claim 1 including leans means for focusing said signal beam onto said film means.

10. An image stabilization system for use with a system for making holographic projection screens including:
    detector means for monitoring an interference pattern created by a signal beam and a reference beam;
    control means responsive to signals from said detector means for providing control signals in response thereto;
    a roof prism for inducing a phase shift in said reference beam; and
    phase shifter positioning means for adjusting said roof prism in response to said control signals from said control means to stabilize the image on the hologram.

11. The invention of claim 10 wherein said detector means includes an interferometer mounted in an optical path of said signal beam and said reference beam.

12. The invention of claim 11 wherein said detector means includes a photodetector operatively connected to said interferometer.

13. A method for making holographic projection screens including the steps of:
    a) moving photographic film along a longitudinal axis thereof in a first direction with a film transport mechanism;
    b) providing an input signal beam;
    c) providing a reference beam;
    d) directing and maintaining said signal beam onto a first area on said film as said film moves in said first direction using a movable beam direction mechanism;
    e) directing said reference beam onto said first area on said film to create an interference pattern with the signal beam thereon;
    f) detecting the interference pattern created by the signal beam and reference beam; and
    g) controlling the movement of the film transport mechanism and the movable beam direction mechanism in response to said interference patter to stabilize the image despite movement of the film.

14. The invention of claim 13 further including the steps of:
    f) monitoring an interference pattern created by said input beam and said reference beam;
    g) providing control signals in response to said interference pattern; and
    h) inducing a phase shift in said reference beam in response to said control signals.

15. A method for stabilizing an image in a system for making holographic projection screens including the steps of:
    a) monitoring an interference pattern created by a signal beam and a reference beam;
    b) providing control signals in response to said interference pattern created by the signal beam and the reference beam; and
    c) inducing a phase shift in said reference beam in response to said control signals using a movable roof prism.

* * * * *